(12) United States Patent
Berti et al.

(10) Patent No.: US 7,087,139 B1
(45) Date of Patent: Aug. 8, 2006

(54) APPARATUS AND METHOD FOR REMOVAL OF VOLATILES FROM A MASS PROCESSABLE POLYMER

(75) Inventors: Douglas A. Berti, Nassau Bay, TX (US); Jose Sosa, Deer Park, TX (US); Aron T. Griffith, Humble, TX (US)

(73) Assignee: Fina Technology, Inc., Houston, TX (US)

( * ) Notice: Subject to any disclaimer, the term of this patent is extended or adjusted under 35 U.S.C. 154(b) by 268 days.

(21) Appl. No.: 10/226,413

(22) Filed: Aug. 23, 2002

(51) Int. Cl.
*B01D 1/00* (2006.01)
*C08F 6/10* (2006.01)

(52) U.S. Cl. ............. 159/2.3; 159/43.1; 159/17.4; 159/DIG. 10; 528/501

(58) Field of Classification Search ........... 159/2.3, 159/2.1, 3, 43.1, 17.4, DIG. 10; 528/501; 525/53
See application file for complete search history.

(56) References Cited

U.S. PATENT DOCUMENTS

| | | | | |
|---|---|---|---|---|
| 951,322 A | * | 3/1910 | Mantius | 159/47.1 |
| 3,630,851 A | * | 12/1971 | Kawaguchi et al. | 202/173 |
| 3,694,535 A | * | 9/1972 | Kimoto et al. | 264/102 |
| 3,853,672 A | * | 12/1974 | Gordon et al. | 159/17.3 |
| 4,004,964 A | * | 1/1977 | Ducasse | 159/17.4 |
| 4,294,652 A | * | 10/1981 | Newman | 159/2.1 |
| 4,439,601 A | | 3/1984 | McCurdy et al. | |
| 5,037,955 A | * | 8/1991 | Dighton et al. | 528/501 |
| 5,102,594 A | * | 4/1992 | Burlet et al. | 264/101 |
| 5,118,388 A | * | 6/1992 | Aboul-Nasr | 159/2.1 |
| 5,540,813 A | | 7/1996 | Sosa et al. | |

* cited by examiner

*Primary Examiner*—Virginia Manoharan
(74) *Attorney, Agent, or Firm*—Tenley R. Krueger

(57) ABSTRACT

The present invention provides an apparatus and method of reducing volatiles in a mass processable polymer. The apparatus includes a multi-chambered devolatilizer having first and second collectors contained therein. In one embodiment, the invention provides a method that includes passing the mass processable polymer stream from a polymerization process to a first devolatilizer. The method continues by passing the polymer stream from the first devolatilizer to the multi-chambered devolatilizer. The apparatus and method allows for the production of a polymer having less than 100 ppm of volatiles.

15 Claims, 4 Drawing Sheets ics and characteristics of the polymer product. However, the presence of these low molecular weight contaminants in the final polymer product may have adverse effects on the polymer properties. Additionally, these volatile components are subject to leaching, thereby precluding use of the polymer product as packaging containers. Accordingly, removal of these undesirable volatile components is highly desirable.

APPARATUS AND METHOD FOR REMOVAL OF VOLATILES FROM A MASS PROCESSABLE POLYMER

TECHNICAL FIELD OF THE INVENTION

The present invention is directed, in general, to the removal of undesirable components from a polymer materials and, more specifically, to an apparatus and method for removing volatile materials at the end stages of a polymerization process.

BACKGROUND OF THE INVENTION

In the preparation of polymeric materials, particularly mass processable polymers, considerable amounts of unreacted monomer and low molecular weight polymers remain entrained in the polymer product after the polymerization process. Additionally, it is common practice to employ various inert solvents and other volatile agents in the polymerization reaction mixture in order to achieve desirable operating conditions and characteristics of the polymer product. However, the presence of these low molecular weight contaminants in the final polymer product may have adverse effects on the polymer properties. Additionally, these volatile components are subject to leaching, thereby precluding use of the polymer product as packaging containers. Accordingly, removal of these undesirable volatile components is highly desirable.

In order to produce the highest quality product, it is desirable to reduce the residual concentration of volatiles in the finished polymer as much as possible. For many commercial applications, such as food packaging, federal regulations impose exacting standards on acceptable levels of volatiles in the polymer product. Thus, much effort has been expended in designing and developing devolatilization apparatus and procedures for use in polymerization processes. However, most current processes still leave undesirably high concentrations of volatiles in the polymer product.

Thus what is needed in the art is an apparatus and method for improved removal of volatiles from a mass processable polymer stream.

SUMMARY OF THE INVENTION

To address the deficiencies of the prior art, the present invention provides a multi-chambered devolatilizer, for use with a devolatilization system, for removing volatiles from a mass processable polymer, that includes a devolatilizer including a first and second collector contained therein. The devolatilizer has a first distribution nozzle located over the first collector, the first collector being fluidly coupled to a second distribution nozzle located over the second collector within the chamber. The first and second distribution nozzles each have a number of distribution openings formed therein for distributing a flow of a mass processable polymer therethrough. The system comprises a first devolatilizer, a second devolatilizer configured as described above, delivery conduits coupling the devolatilizers, and pumps to move the polymer through the system.

In another embodiment, the present invention provides a method for removing volatiles from a mass processable polymer that includes passing a mass processable polymer through a first devolatilizer. The method further includes passing the mass processable polymer from the first devolatilizer to a second devolatilizer configured as described above. The second devolatilizer has first and second collectors and first and second distribution nozzles contained therein. The mass processable polymer passes through the first distribution nozzle and into the first collector. The polymer passes from the first collector to the second distribution nozzle and into the second collector. The first and second distribution nozzles each have a number of distribution openings formed therein, for distributing a flow of a mass processable polymer therethrough.

The foregoing has outlined, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the invention, reference is now made to the following descriptions taken in conjunction with the accompanying drawing, in which.

DETAILED DESCRIPTION

Figure 1:
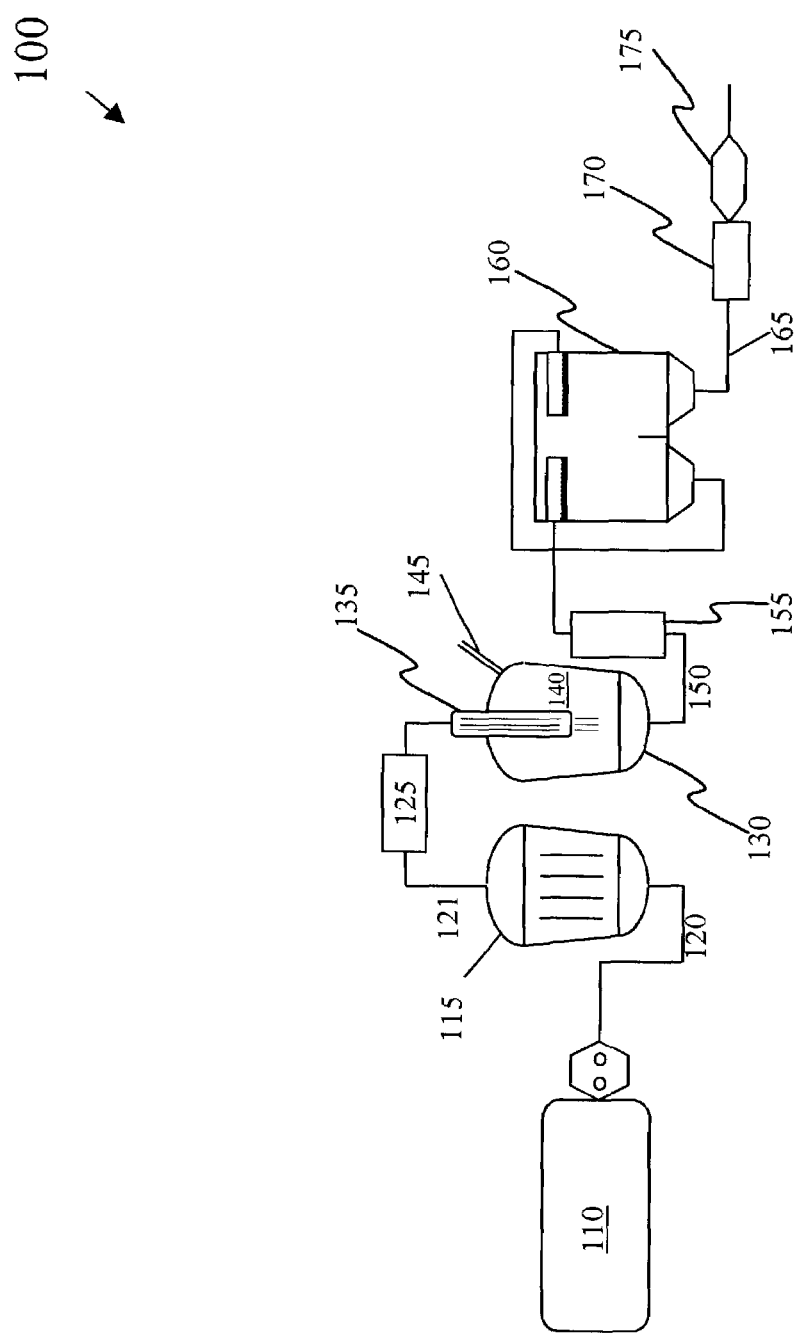
FIG. 1 illustrates a schematic representation of one embodiment of a polymerization system designed according to the present invention.

Referring now to FIG. 1, there is illustrated a system 100 for reducing volatiles in a mass processable polymer stream. The system 100 includes a reactor 110, which is normally the last reactor in a series of such reactors for manufacturing a polymer. Certain embodiments of the present invention may additionally include a heat exchanger 115 that serves as an additional polymer reactor. Reactor 110 and heat exchanger 115 are connected by delivery conduit 120. Heat exchanger 115 may be of any configuration including up-flow and down-flow types. The polymer stream exits the heat exchanger 115 via delivery conduit 121. In some embodiments, the polymer may be advanced by an advancing mechanism 125, such as a pump, to a first devolatilizer 130. In other embodiments, advancing mechanism 125 may not be necessary. The first devolatilizer 130 may be operated at a reduced pressure, defined as less than 760 Torr, for example, by creating a vacuum from about 20 Torr to about 200 Torr.

In those embodiments including the first devolatilizer 130, the first devolatilizer 130 may include a heat exchanger 135 that may be identified as a devolatilization preheater, such as, but not limited to, a shell and tube heat exchange structure. The heat exchanger 135 may be operated to provide heat to the polymer stream to facilitate the devolatilization of the stream as it enters the devolatilization tank 140. Thus, the heat exchanger 135 may be operated at any temperature suitable for removing volatiles; however, the heat exchanger 135 is preferably maintained at a temperature ranging from about 350° F. to about 520° F. The first devolatilizer 130 will also preferably include at least one vapor removal line 145. Alternatively, the first devolatilizer 130 may be configured as a hoop-falling strand devolatilizer. As the heated polymer stream exits the heat exchanger 135 and enters the devolatilization tank 140, volatiles are removed through the vapor removal line 145. The partially devolatilized polymer stream then enters delivery conduit 150 and may be advanced by pump 155 to the multi-chambered devolatilizer 160.

The multi-chambered devolatilizer 160 serves to further reduce the concentration of volatiles in the polymer stream. However, in certain embodiments, the polymer stream may exit the reactor portion of system 100 directly into the multi-chambered devolatilizer 160. In one embodiment, the multi-chambered devolatilizer 160 may be operated at a reduced pressure, which as defined above, is less than 760 Torr. In particular, the pressure may be less than about 1 Torr to about 200 Torr, with a preferred operating range of about 1 Torr to about 5 Torr. As with the first devolatilizer 130, the multi-chambered devolatilizer, 160, may be operated at any temperature suitable for removing volatiles. The multi-chambered devolatilizer, however, is preferably operated at about 380° F. to about 500° F. After passing through the multi-chambered devolatilizer, the devolatilized polymer stream exits through delivery conduit 165 and may be transmitted by pump 170 to a finishing operation 175. In certain embodiments, the finishing operation 175 may include a pelletizer.

Figure 2:
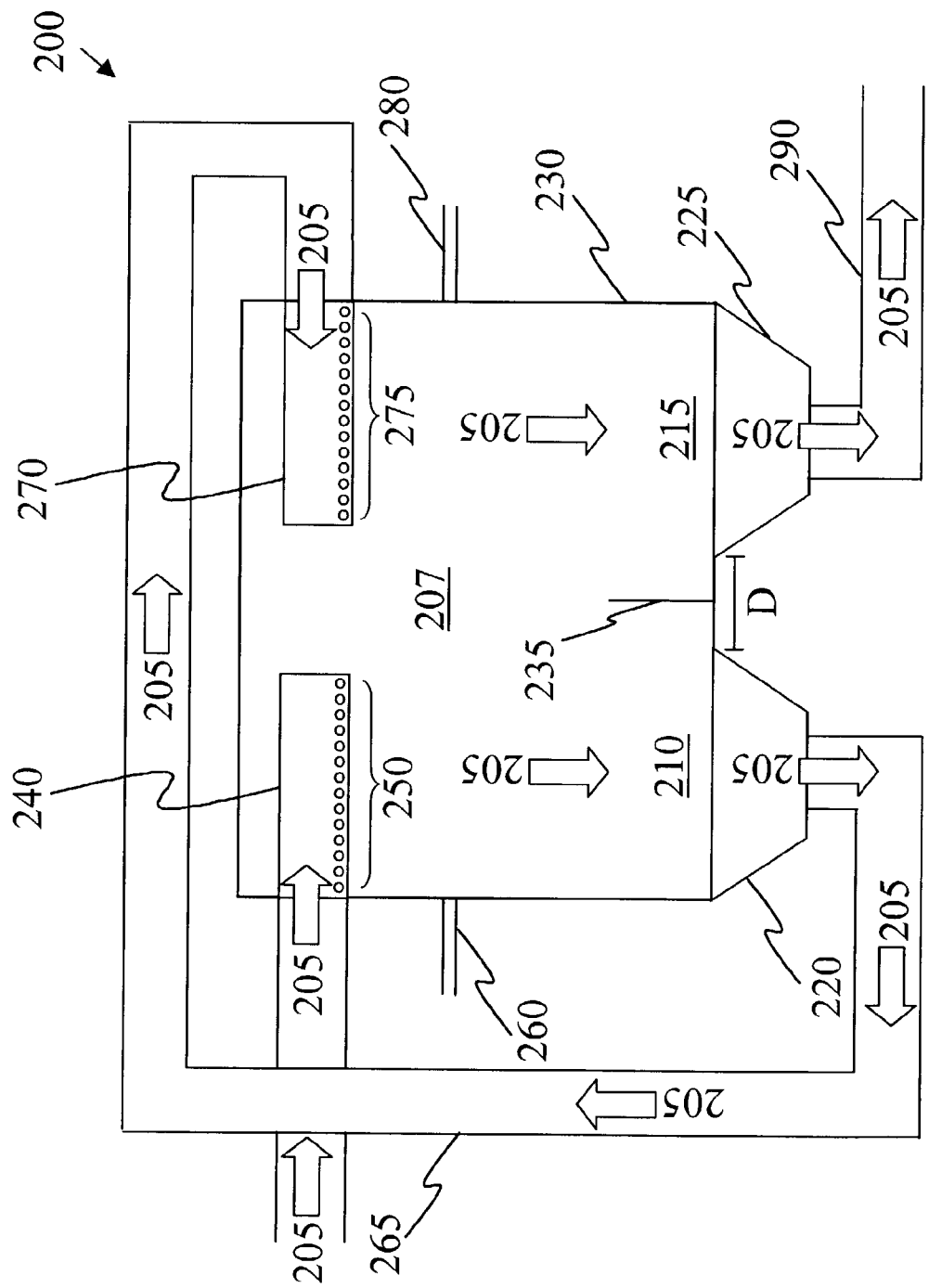
FIG. 2 illustrates a schematic representation of an embodiment of the devolatilizer of the present invention.

Turning to FIG. 2, there is illustrated an embodiment of a multi-chambered devolatilizer 200 according to the present invention. The flow of the devolatilizing polymer stream 205 through the devolatilizer 200 is depicted by arrows. The multi-chambered devolatilizer 200 comprises a devolatilizer chamber 207 including a first collector 220 and a second collector 225 contained therein. The devolatilizer chamber has a first distribution nozzle 240 located over the first collector 220, the first collector 220 being fluidly coupled to a second distribution nozzle 270 located over said second collector 225 within the devolatilizer chamber 207. The first and second distribution nozzles 240, 270 each have a number of distribution openings 250, 275 formed therein for distributing a flow of a mass processable polymer therethrough.

Collector regions 220 and 225 may be any structure sufficient to segregate the polymer stream 205 as it is devolatilized as described below. For example, collectors 220 and 225 may be separated by some distance D. Alternatively, collectors 220 and 225 may have a conical shape, such as that depicted in FIG. 2. In certain embodiments, an interior wall 235 may be situated between collectors 220 and 225 to separate a first devolatilization chamber 210 and a second devolatilization chamber 215, to facilitate segregation of the polymer stream 205 being devolatilized into chambers 210, 215. For the purposes of the present invention, chambers 210 and 215 are defined as the volumes above collector regions 220 and 225, respectively, and enclosed by an outer wall 230. In certain embodiments, devolatilization chambers 210, 215 may share the interior wall 235. In other embodiments, however, two or more interior walls may be situated between collectors 220 and 225 (not shown). In still other embodiments, the interior wall 235 may partially separate the first and second devolatilization chambers 210 and 215. For example, the interior common wall 235 may include a baffle located between the first devolatilization chamber 210 and the second devolatilization chamber 215. In other embodiments, the interior common wall 235 may completely separate the chambers 210 and 215. Thus, the second devolatilization chamber 215 may be operated at a reduced pressure different from the first devolatilization chamber 210. In one embodiment, for example, the second devolatilization chamber 215 operates at a lower pressure than the first devolatilization chamber 210.

The first devolatilization chamber 210 includes several components, including a first distribution nozzle 240. The first distribution nozzle 240 is designed to have a number of holes 250, preferably arrayed along its bottom surface. In other embodiments, the holes may be formed over the entire surface of the distribution nozzle 240. In particular embodiments, the distribution nozzle 240 may have from about a few hundred to about two thousand of such holes 250. In plant scale embodiments, the number of holes could be in excess of 1 million. In other embodiments, the holes 250 have a diameter of about 1/64 to about 5/32 inches in diameter. In a plant scale embodiment, for example, the holes may preferably have a diameter of about 6/16 to about 7/16 inches. In certain embodiments, the holes 250 will have a diameter of about 3/64 inches. Additionally, the first distribution nozzle 240 may be operated at an elevated temperature to facilitate the removal of greater amounts of volatiles from the polymer stream. In particular embodiments, the temperature of the first distribution nozzle may be about 460° F. to about 540° F. Preferably, the temperature of the first distribution nozzle ranges from about 460° F. to about 480° F.

The polymer stream 205 is fed into the first devolatilization chamber 210 after passing through the holes 250 of the first distribution nozzle 240. As the polymer stream 205 passes into the first devolatilization chamber 210 and falls into the first collector 220, volatiles are removed through one or more vapor removal lines 260. The polymer stream 205 exits the first collector 220 below the first devolatilization chamber 210 through delivery conduit 265 and may be pumped to the second devolatilization chamber 215.

The second devolatilization chamber 215 includes a second distribution nozzle 270. The second distribution nozzle 270 also may be configured to have an array of holes 275 over at least a portion of its surface. In certain embodiments, the number of holes 275 may be equal to the number of holes 250 in the first distribution nozzle 240. For example, in the pilot plant experiments described below, the number of holes 250, 275 range from about 700 to about 2000. One skilled in the art, however, could adjust these numbers up to appropriate values for a full scale plant. In other embodiments, the number of holes 275 may be greater than the number of holes 250 in the first distribution nozzle 240. The holes 275 may have a diameter ranging from about 1/64 inches to about 5/32 inches. In particular embodiments, the holes 275 will have a diameter of about 3/64 inches. Additionally, the second distribution nozzle 270 may be operated at an elevated temperature, for example, the same ranges as described above for the first distribution nozzle, to facilitate the removal of greater amounts of volatiles from the polymer stream. In particular embodiments, the temperature of the second distribution nozzle 270 may be operated at a temperature higher than the temperature of the first distribution nozzle 240.

The polymer stream 205, as noted above, enters the second devolatilization chamber 215 through the holes 275 of the second distribution nozzle 240. As the polymer stream 205 passes into the second devolatilization chamber 215 and falls into the second collector 220, volatiles are removed through one or more vapor removal lines 280. The devolatilized polymer stream 205 exits the second devolatiliation chamber 215 of the multi-chambered devolatilizer 200 through delivery conduit 290. Delivery conduit 290 couples the second devolatilization chamber 215 to desired finishing operations.

Figure 3:
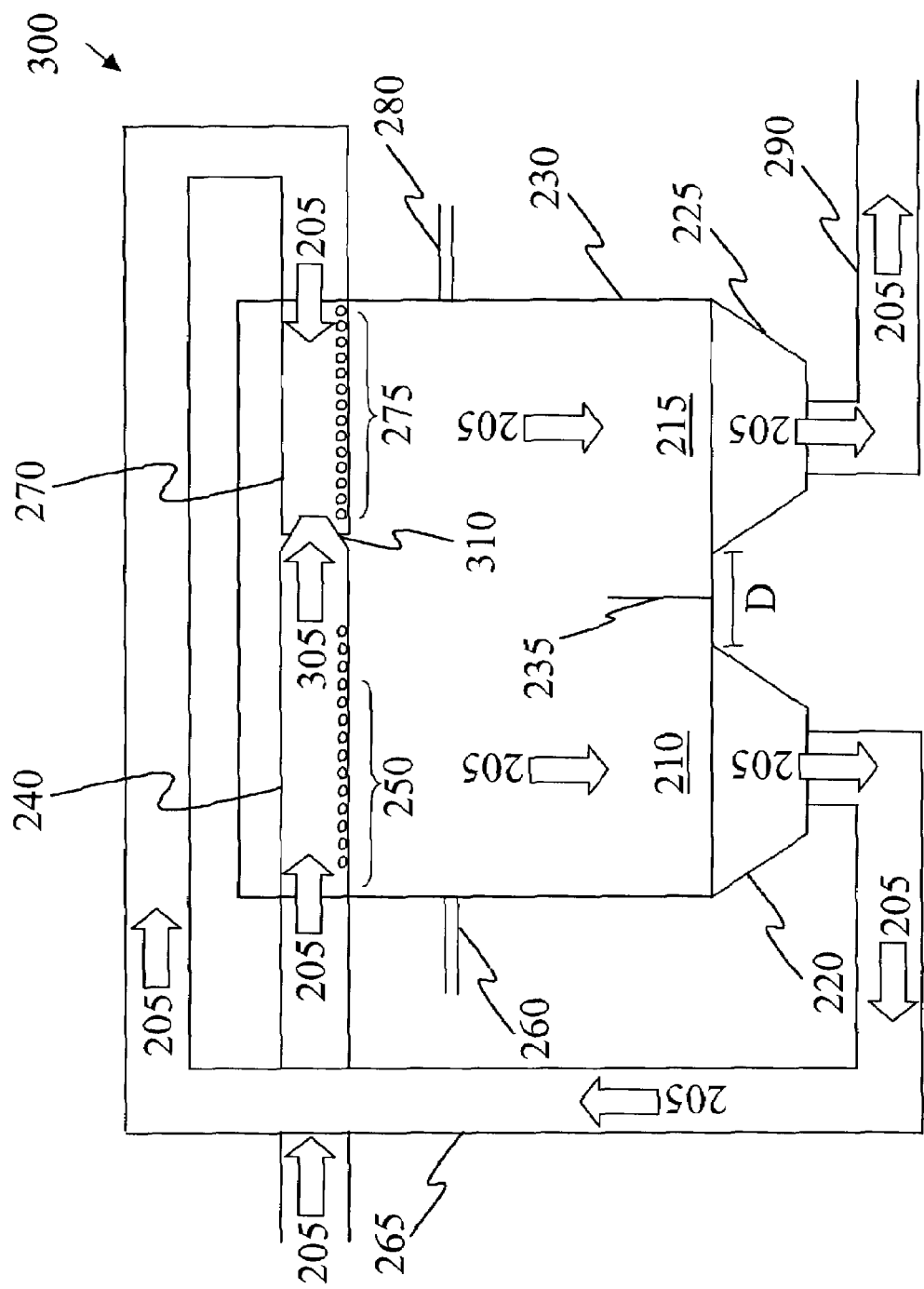
FIG. 3 illustrates a schematic representation of an alternative embodiment of the multi-chambered devolatilizer of the present invention.

Now turning to FIG. 3 with continued reference to FIG. 2, there is illustrated an exemplary alternative embodiment of the multi-chambered devolatilizer 300 of the present invention. In such embodiments, the multi-chambered devolatilizer 300 may be configured so that only a portion of the polymer stream 305 is passed through the first distribution nozzle 240. In such embodiments, the first distribution nozzle 240 is connected at one end 310 to the second distribution nozzle 270. In some embodiments, the end 310 of the first distribution nozzle 240 that is connected to the second distribution nozzle 270 may be tapered to allow improved mating of the nozzles 240, 270. In these embodiments, the configuration of holes 250 and 275 may be adjusted to control a fraction of the polymer stream 305 that passes directly from the first distribution nozzle 240 to the second distribution nozzle 270. The fraction will be a function of the relative number and diameter of the holes 250, 275. In one embodiment, the number of holes 275 is about 2.5 times the number of holes 250.

Figure 4:
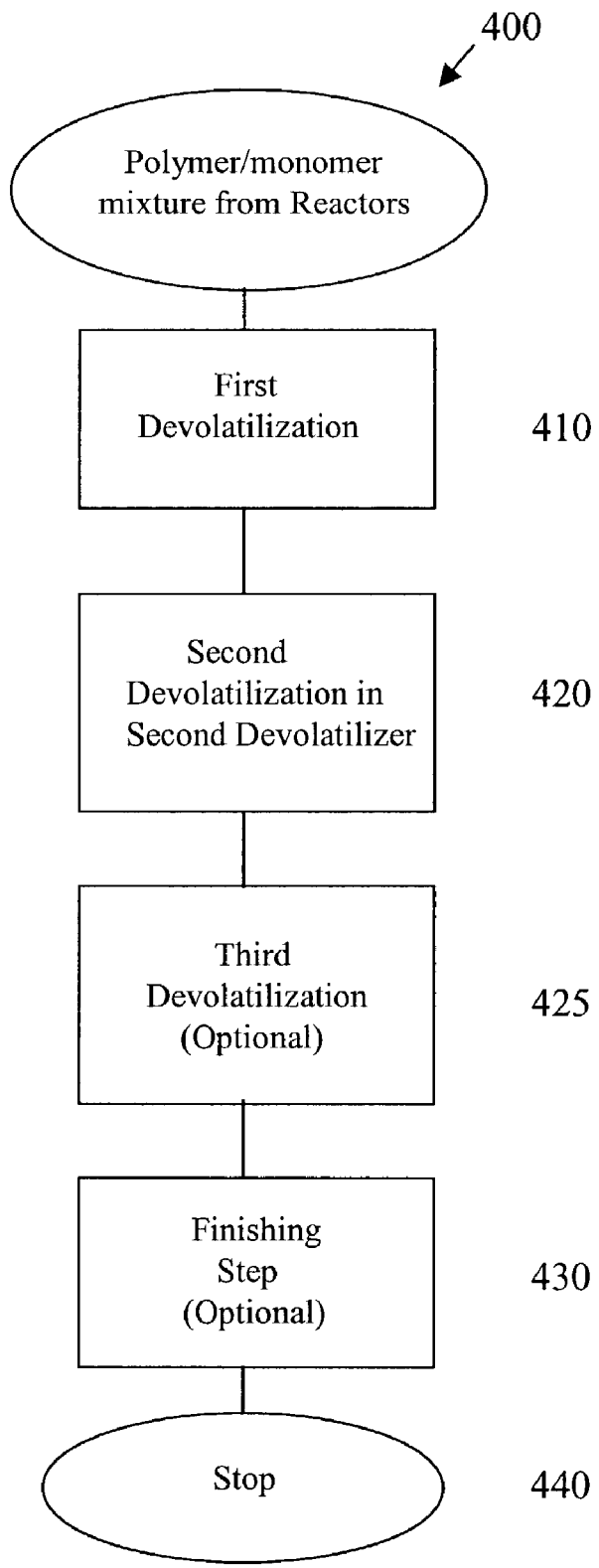
FIG. 4 illustrates a representative embodiment of a method of devolatilizing a mass processable polymer according to the present invention.

In another aspect the present invention provides a method of removing volatiles from a mass processable polymer stream. FIG. 4 illustrates a flow diagram for an embodiment of an exemplary method of devolatilizing a polymer stream according to the present invention. The method 400 begins by a first devolatilization step 410 by passing a mass processable polymer from a reactor system through a first devolatilizer. The first devolatilizer may be comprised of any conventional devolatilizer, or any of the embodiments of the multi-chambered devolatilizer described herein. The mass processable polymer may then be passed from the first devolatilizer to a second devolatilizer at second devolatilization step 420. The second devolatilizer may be constructed as described above, for example. The second devolatilization step 420 includes passing the polymer stream through a first distribution nozzle and into a first collector. The step 420 also includes passing the polymer from the first collector to the second distribution nozzle and into a second collector. The steps 410 and 420 also include passing the polymer stream through holes in the delivery nozzles to aid in devolatilization and may be performed at the temperatures and pressures discussed above. In certain embodiments, the method 400 may include a finishing step 430, such as pelletization. The process ends at stop step 440.

Alternatively, step 420 of method 400 may include continuously passing a first portion of the polymer stream from an end of the first distribution nozzle directly to the second distribution nozzle. In certain embodiments, the end may be tapered, such as that depicted in FIG. 3, for example. In such embodiments, the first portion by-passes the first collector and exits the second distribution nozzle through the openings therein. The remaining or second portion of the polymer stream passes from the first distribution nozzle to the first collector. This remaining portion of the polymer stream may be advanced to the second distribution nozzle and the process continued as described above.

Other embodiments of the method 400 may additionally include step 425 that includes passing the polymer stream from the second multi-chambered devolatilizer to a subsequent devolatilizer before finishing step 430. The subsequent devolatilizer, for example, may be a falling strand type devolatilzer or another multichambered devolatilzer.

The method and apparatus described above is clearly superior to currently available devolatilizers and devolatilization methods. Polymers devolatilized with the present invention may be prepared having less than 100 ppm residual volatiles. Certain embodiments can reduce the concentration of volatiles to about 50 ppm.

Having described the present invention it is believed that the same will become even more apparent by reference to the following examples. It will be appreciated that the examples are presented solely for the purpose of illustration and should not be construed as limiting the invention. For example, although the experiments described below were carried out on a pilot plant, one skilled in the art could adjust specific numbers, dimensions and quantities up to appropriate values for a full scale plant.

EXAMPLES

For comparative purposes, four different types of polystyrene samples of the polymer reaction stream were devolatilized with a conventional process. The samples were all high impact polystrenes (HIPS). This was accomplished by configuring the devolatilization system in the following manner. The first devolatilizer was configured to include a heat exchanger. The multi-chambered devolatilizer, was configured as a single-chambered second devolatilizer by eliminating the holes in the first distribution nozzle. Having no holes in the first distribution nozzle forces the entire polymer feed stream to the second distribution nozzle. Polymer samples passed through this system consistently had much higher residual volatile concentrations than using the devolatilization system and method disclosed in the present invention. Volatile concentrations in this conventional configuration averaged about 250 ppm and ranged from 160 ppm up to 380 ppm. These results are tabulated in the second column of Table I.

The same four types of polystyrene samples were devolatilized with the devolatilizer and methods of the present invention. In one set of experiments, the polystyrene stream was passed from the first devolatilizer, configured as described above, into the multi-chambered devolatilizer of the present invention. In this experiment, both distribution nozzles had closed ends, thereby forcing the polymer entering the devolatilizer to fall to the first collector region of the first chamber. The multi-chambered devolatilizer was configured to allow a common vapor area, with the interior wall of the chamber preventing mixture of the polymers. The first distribution nozzle was configured to have about 1200 holes formed in the bottom surface of the nozzle. Each hole had a diameter of 3/64 inches. The temperature of the first distribution nozzle was maintained at about 480° F. with a conventional oil bath. The pressure in the chamber ranged from about 1 Torr to about 5 torr. The polymer stream was then transmitted through conventional piping to the second distribution nozzle of the multi-chambered devolatilizer. The second distribution nozzle was configured to have holes of equal number and diameter as the first distribution nozzle and maintained at about 480° F. The polymer stream was then forced through the holes in the second distribution nozzle into the second devolatilization chamber, which was maintained at a reduced pressure, for example, about 1 Torr to about 5 Torr.

The concentration of volatiles in these samples was consistently below 100 ppm, with an average value of about 65 ppm. For some samples, volatile concentrations were as low as 40 ppm. These results are tabulated in the fourth column of Table I.

In a second set of experiments, the same four HIPS, and an additional fifth General Purpose Polystyrene (GPPS) sample (sample 585), were passed through the multi-chambered devolatilizier configured to allow partial recycling of the polymer stream. Similar to that described above, polymer stream was first passed through a first devolatilizer, configured as described above, into the multi-chambered devolatilizer. The first distribution nozzle was tapered at one end and joined to the second distribution nozzle. The first distribution nozzle was configured to have about 770 holes, each hole having a diameter of 3/64 inches. The second distribution nozzle was configured to have about 1930 holes, each hole having a diameter of 3/64 inches. Both first and second distribution nozzle temperatures were maintained at about 480° F. Such a configuration causes approximately 40 percent of the polymer stream to be passed through the holes in the first distribution nozzle and into the first devolatilization chamber. This portion was then collected and transmitted through conventional piping to the second distribution nozzle. The other 60 percent of the polymer stream passed directly from the first distribution nozzle to the second distribution nozzle. The combined streams then passed through the holes in the distribution nozzle into the second devolatilization chamber.

The configuration used in the second set of experiments, allowing partial recycling, produced samples with slightly higher residual volatile concentrations compared to the configuration in the first set of experiments, allowing no recycling. For instance, the concentration of volatiles in the former experiments ranged from about 90 ppm to about 250 ppm. The average concentration of volatiles was about 165 ppm. These results are tabulated in the third column of Table I.

TABLE I

| Polystyrene Sample | Conventional Devolatilization min, max, ave (ppm) | Present Invention with Partial Recycle min, max, ave (ppm) | Present Invention with Full Recycle min, max, ave (ppm) |
|---|---|---|---|
| 945 | 210, 370, 280 | 160, 240, 203 | 50, 70, 67 |
| CX7216 | 160, 230, 205 | 110, 250, 173 | 60, 60, 60 |
| CX7200 | 190, 190, 190 | 110, 200, 148 | 40, 70, 57 |
| 825EX | 200, 380, 304 | 90, 240, 139 | 50, 80, 64 |
| 585 | 100, 290, 197 | 80, 310, 146 | 70, 90, 83 |

Thus, the present invention provides a method and apparatus for significantly reducing the concentration of residual volatile components in polymer products.

Although the present invention has been described in detail, those skilled in the art should understand that any polymer composition may be devolatilized with the method and apparatus of the present invention. For instance, one may be able to apply the present invention to any homopolymer or copolymer fabrication process. One skilled in the art can make various other changes, substitutions and alterations herein without departing from the spirit and scope of the invention.

What is claimed is:

1. For use with a devolatilization system for removing volatiles from a mass processable polymer, a multi-chambered devolatilizer, comprising:
    a devolatilizer chamber including a first collector and a second collector contained therein, said devolatilizer chamber having a first distribution nozzle located over said first collector, said first collector being fluidly coupled to a second distribution nozzle located over said second collector within said devolatilizer chamber and wherein said first distribution nozzle is connected at an end thereof to said second distribution nozzle to allow said mass processable polymer to flow from said first distribution nozzle to said second distribution nozzle, said first and second distribution nozzles each having a number of distribution openings formed therein for distributing a flow of a mass processable polymer therethrough and wherein said first and second collectors are separated by an interior wall and said wall comprises a baffle.

2. The multi-chambered devolatilizer as recited in claim 1 wherein said devolatilizer has one or more vapor removal lines formed therein for allowing removal of volatiles.

3. The multi-chambered devolatilizer as recited in claim 1 wherein said number of distribution openings in said second distribution nozzle is equal to said number of distribution openings in said first distribution nozzle.

4. The multi-chambered devolatilizer as recited in claim 1 wherein said number of distribution openings in said second distribution nozzle is greater than said number of distribution openings in said first distribution nozzle.

5. The multi-chambered devolatilizer as recited in claim 1 wherein said multi-chambered devolatilizer is fluidly coupled to a subsequent devolatilizer.

6. The multi-chambered devolatilizer as recited in claim 1 wherein said end is tapered sufficiently to allow improved connection between said first distribution nozzle and said second distribution nozzle.

7. For use with a devolatilization system for removing volatiles from a mass processable polymer, a multi-chambered devolatilizer, comprising:
    a devolatilizer chamber including a first collector and a second collector contained therein, said devolatilizer chamber having a first distribution nozzle located over said first collector, said first collector being fluidly coupled to a second distribution nozzle located over said second collector within said devolatilizer chamber and wherein said first distribution nozzle is connected at an end thereof to said second distribution nozzle to allow said mass processable polymer to flow from said first distribution nozzle to said second distribution nozzle, said first and second distribution nozzles each having a number of distribution openings formed therein for distributing a flow of a mass processable polymer therethrough, wherein said number of distribution openings in said second distribution nozzle is about 2.5 times said number of distribution opening in said first distribution nozzle.

8. A devolatilization system for removing volatiles from a mass processable polymer, comprising:
    a first devolatilizer;
    a second devolatilizer, including:
        a first collector and a second collector therein, said second devolatilizer having a first distribution nozzle located over said first collector, said first collector being fluidly coupled to a second distribution nozzle located over said second collector within said second devolatilizer, wherein the first and second distribution nozzles pass a portion of a mass processable polymer through the first distribution nozzle to the second distribution nozzle and said first and second distribution nozzles each having a number of distribution openings formed therein for distributing a flow of the mass processable polymer therethrough, and wherein said first and second collectors are separated by an interior wall and said wall comprises a baffle;

delivery conduits coupling said first devolatilizer to said second devolatilizer; and pumps coupled to said delivery conduits configured to move said mass processable polymer through said devolatilization system.

9. The devolatilization system as recited in claim 8 wherein a first devolatilization chamber comprises a first volume above said first collector, and a second devolatilization chamber comprises a second volume above said second collector, said first and said second devolatilization chambers have one or more vapor removal lines formed therein for allowing removal of volatiles.

10. The devolatilization system as recited in claim 8 wherein said number of distribution openings in said second distribution nozzle is equal to said number of distribution openings in said first distribution nozzle.

11. The devolatilization system as recited in claim 8 wherein said number of distribution openings in said second distribution nozzle is greater than said number of distribution openings in said first distribution nozzle.

12. The devolatilization system as recited in claim 8 wherein said second devolatilizer is fluidly coupled to a subsequent third devolatilzer.

13. The devolatilization system as recited in claim 8 wherein said first distribution nozzle is connected at an end thereof to said second distribution nozzle to allow said mass processable polymer to flow from said first distribution nozzle to said second distribution nozzle.

14. The devolatiliation system as recited in claim 13 wherein said end is tapered sufficiently to allow improved connection between said first distribution nozzle and said second distribution nozzle.

15. A devolatilization system for removing volatiles from a mass processable polymer, comprising:

a first devolatilizer;

a second devolatilizer, including:

a first collector and a second collector therein, said second devolatilizer having a first distribution nozzle located over said first collector, said first collector being fluidly coupled to a second distribution nozzle located over said second collector within said second devolatilizer, wherein the first and second distribution nozzles pass a portion of a mass processable polymer through the first distribution nozzle to the second distribution nozzle and said first and second distribution nozzles each having a number of distribution openings formed therein for distributing a flow of the mass processable polymer therethrough, wherein said number of distribution openings in said second distribution nozzle is about 2.5 times said number of distribution openings in said first distribution nozzle;

delivery conduits coupling said first devolatilizer to said second devolatilizer; and pumps coupled to said delivery conduits confined to move said mass processable polymer through said devolatilization system.

* * * * *